(12) United States Patent
Schlueter et al.

(10) Patent No.: US 6,783,391 B2
(45) Date of Patent: Aug. 31, 2004

(54) CARRIER FOR SEVERAL CABLE HOLDERS

(75) Inventors: Malte Schlueter, Boeblingen (DE);
Jens Heitkamp, Gaeufelden (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/237,390

(22) Filed: Sep. 9, 2002

(65) Prior Publication Data

US 2003/0092313 A1 May 15, 2003

(30) Foreign Application Priority Data

Nov. 10, 2001 (EP) ............................................ 01126836

(51) Int. Cl.⁷ ................................................. H01R 13/00
(52) U.S. Cl. ................................................. 439/540.1
(58) Field of Search ........................... 439/640.1, 658, 439/680, 686, 752

(56) References Cited

U.S. PATENT DOCUMENTS 4,596,436 A  6/1986  Kraemer et al. ........ 339/206 R
6,343,950 B1 *  2/2002  Eginton et al. .......... 439/540.1
6,412,986 B1 *  7/2002  Ngo et al. .................... 385/53

FOREIGN PATENT DOCUMENTS

EP   0672927 A1   9/1995

OTHER PUBLICATIONS

Patent Abstracts of Japan publication No.: 05313040.
Patent Abstracts of Japan publication No.: 60135912.
Patent Abstracts of Japan publication No.: 63233346.

* cited by examiner

*Primary Examiner*—Hung V. Ngo
(74) *Attorney, Agent, or Firm*—Perman & Green, LLP

(57) ABSTRACT

A carrier for several cable holders, especially of fiber optical cables, includes a housing that comprises several receptacles on one cable holder side, into which one of the cable holders can be plugged respectively. A cable that is held by the cable holder and that sticks out from it in a plug direction penetrates the housing on a device side that faces away from the cable holder side. The plug directions of several or all receptacles run parallel to each other.

13 Claims, 2 Drawing Sheets

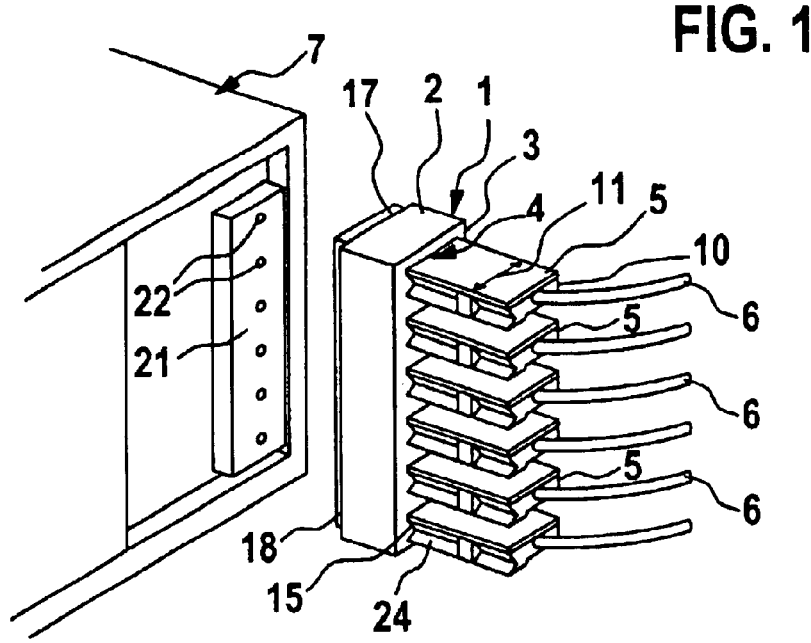
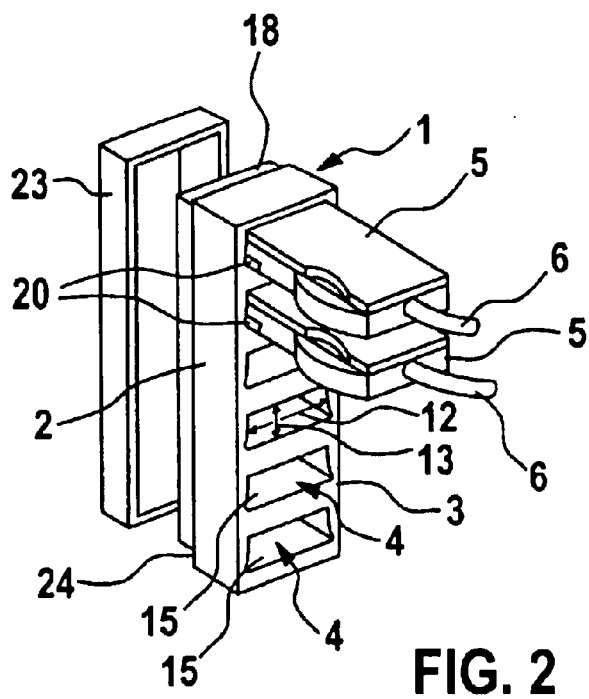
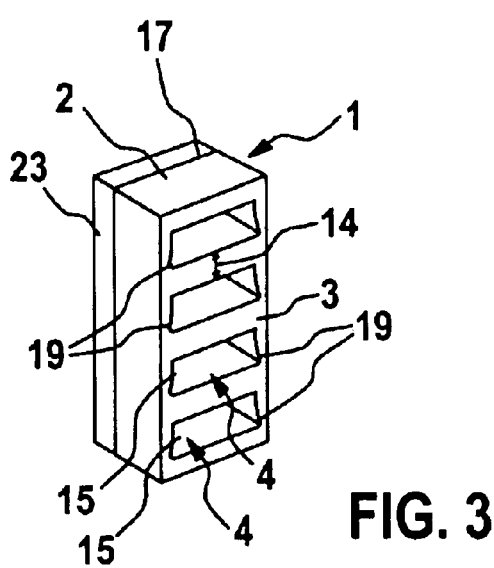

CARRIER FOR SEVERAL CABLE HOLDERS

BACKGROUND OF THE INVENTION

The present invention concerns a carrier for several cable holders, in particular of optical fiber cables.

Cable holders, particularly for optical fiber cables, are used when optical components or parts, preferably after their manufacture, are to be tested and/or gauged with respect to their proper functioning for example. Usually, a large number of optical fiber cables are connected to a suitable measuring and/or testing device for this purpose. In order to improve manageability, the optical fiber cables are equipped with a cable holder for connection to the measuring and/or testing device. Such a cable holder appropriately comprises a plug that can be plugged into a corresponding socket on the measuring and/or testing device. Subsequently, the highest possible quality optical signal transmission can be guaranteed when taking readings. The user must also ply the cables very carefully as the open cable ends sticking out from the respective cable holder are extremely touch sensitive, in particular in case of optical fiber cables. It is therefore advisable to plug the cable holder into the socket of the measuring and/or testing device immediately after attachment to the cable. Since a relatively large number of cables must be connected to the respective measuring and/or testing device using such a cable holder for testing test more complex components, there exists a need to simplify the management of the individual cable holders.

An electrical multiple plug is known from U.S. Pat. No. 4,596,436, and JP-A-05 313040 presents an optical multiple plug. Other optical plugs are known from JP-A-60 135912, JP-63 233346 or EP-A-672927.

SUMMARY OF THE INVENTION

The current invention deals with the issue of presenting a way to simplify the manageability of cable holders. This problem is solved by means of the objects of the independent claims. Preferred designs are the object of the dependent claims.

The current invention is based on the notion of providing a carrier into which several cable holders can be plugged. With this proposal it is possible to fasten several cable holders in the carrier at the same time, subsequently merging them for easier manageability. This is because a certain number of cable holders can be handled simultaneously without the need for particularly painstaking exactness with a carrier that incorporates several cable holders at the same time. The carrier can serve as a stacking unit or depot for the cable holders, for example, before it is plugged into the socket of the measuring and/or testing device.

In one particularly advantageous embodiment, the carrier is designed as a multiple plug to be plugged into a complementary multiple socket arranged on the respective measuring and testing device. Subsequently, several cable holders plugged into the carrier can be connected simultaneously to the respective measuring and/or testing device by means of the carrier with this scheme. The cable holders also become easier to manage as a result.

Furthermore, in another design a protective cap can be provided that can be attached to the housing of the carrier and thereby receive and externally protect the open ends of the cables of the cable holders plugged into the carrier. With the aid of this protective cap, the carrier can be used particularly well as an intermediate stacking unit for the individual cable holders, wherein the protective cap effectively prevents contact of the sensitive open cable ends. If the protective cap is designed to be removable, the carrier can be designed again suitably as a multiple plug.

According to another embodiment, several, particularly all receptacles arranged on the carrier provide a larger width than height transverse to the plug direction of the cable holders, wherein such receptacles are arranged upward over each other or next to each other on the carrier housing. Such a construction allows the dimensions of the carrier to be relatively compact. In particular, the distances of receptacles arranged over each other and/or next to each other can be chosen relatively small to achieve relatively compact stacking of the cable holders. This type of construction is advantageous if there is only relatively little space on the measuring and/or testing device for connecting the cable holders. Due to the compact build of the carrier, several cable holders can be connected very easily to the measuring and/or testing device manually at the same time, whereas in the case of cramped space, manual attachment of the individual cable holders is not easily possible. Moreover, this embodiment makes it possible to arrange several multiple sockets on the measuring and/or testing device widthwise next to each other in order to connect several carriers designed as multiple plugs onto the measuring and/or testing device next to each other. Such a dense arrangement of individual cable holders on the measuring and/or testing device is hardly feasible with cable holders that can be plugged in individually, or if so, only with a great amount of skill involved.

BRIEF DESCRIPTION OF THE DRAWINGS

The invention is explained below by means of reference to the drawings, wherein alike reference marks refer to alike or functionally equivalent or similar characteristics. It is shown schematically in:

FIG. 1 a perspective view of a carrier according to the invention being connected to a device only partially shown, FIG. 2 a perspective view of the carrier according to the invention with a protective cap being attached, FIG. 3 a perspective view of the carrier according to the invention with a protective cap attached, however in another embodiment, FIG. 4 a perspective view of the carrier according to the invention with a protective cap attached, viewed from another direction, however, FIG. 5 a perspective view of the carrier according to the invention upon attaching the protective cap, however in another embodiment, and FIG. 6 a view like in FIG. 1, however in another embodiment.

DETAILED DESCRIPTION OF THE DRAWINGS

Figure 4:
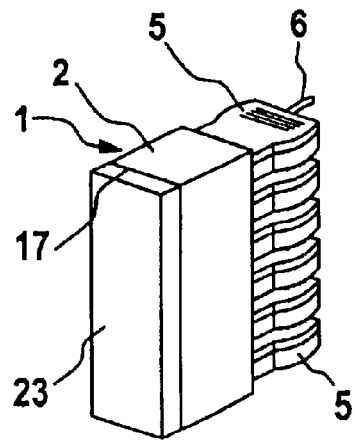

According to FIGS. 1 through 4, a carrier 1 according to the invention provides a housing 2, which can be designed box-shaped. The housing 2 has several receptacles 4 on a cable holder side 3 facing the viewer in FIGS. 1 through 3. A cable holder 5 can be plugged into each of these receptacles 4, in which a cable 6, in particular a fiber optics cable or optical fiber respectively, is fastened. Usually, only one end or one end section of the respective cable 6 is fastened in the cable holders 5. In the embodiment of FIG. 3, the housing comprises four plug slots or receptacles 4, while the embodiments of the other figures each have six receptacles 4.

Figure 5:
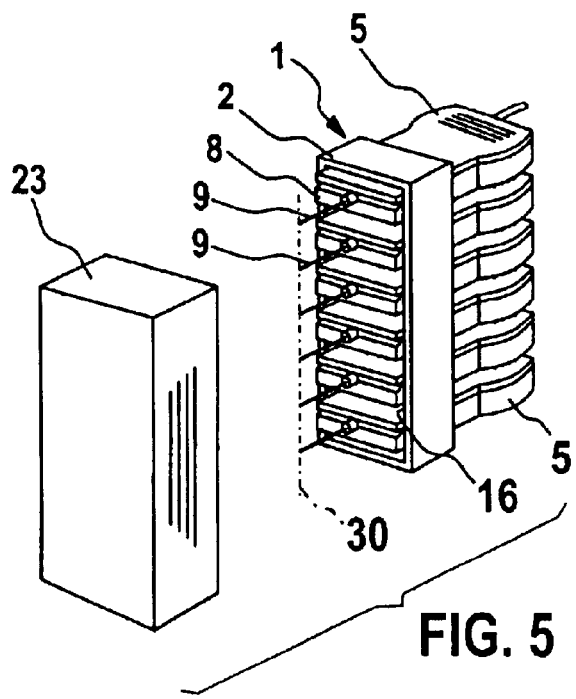

The cables 6 are usually connected to a component to be tested and/or gauged and must be equipped with such a cable holder 5 that aligns and positions the cable ends in a predetermined manner to be connected to a measuring and/or testing device 7. As can be seen in FIG. 5 for example, the cable 6 sticks out forward on one front side 8 of the cable holders 5. As can be seen from FIGS. 5 and 6, cable 6 can be an optical fiber cable, the end of which, positioned by cable holder 5, is stripped of its insulation such that the end of an optical fiber 9 is left open.

The plugs 5 are suitably adapted to an apparatus for handling the cables 6 not shown here. An optical fiber cable 6 that is still completely insulated is loaded into the cable holder 5, for example, and attached therein for handling in the aforementioned apparatus. The cable holder 5 can then be inserted into this apparatus and localized therein to position the cable 6 for subsequent handling. For example, the optical fiber cable can be stripped in this apparatus and finally the stripped optical fiber can be trimmed to a certain length. After such treatment, the trimmed open end of the optical fibers 9 holds a certain position relative to the cable holder 5 that is suited for connecting the optical fiber cable 6 with the cable holder 5 onto the measuring and/or testing device 7.

The receptacles 4 in the housing 2 are designed such that the cable holders 5 plugged into it each provide a predetermined position that is relative to the housing 2. This is achieved, for example, with the aid of a lock not explained in more detail here, which can be realized, for example, by means of a surmountable plug resistance in the plugging action. The receptacles 4 are designed complementary to the cable holders 5. The cable holders 5 used here build relatively flat, which means that a height 10 (cf. FIG. 1) measured transverse to its plug direction, is in particular two to four times smaller than a width 11 measured transverse to the plug direction. The complementary receptacles 4 are likewise designed "flat" accordingly and provide a greater width 12 (cf. FIG. 2) than height 13 transverse to the plug direction.

In order to be able to compactly stack the inserted cable holders 5 in the carrier, in the embodiments shown here all receptacles 4 are arranged over each other in one direction parallel to the height 13 of the receptacles 4. Additionally, a distance 14 between adjacent receptacles 4, drawn in FIG. 3, can be relatively small, in particular equally as large or smaller than a height 13 of a receptacle 4. This scheme leads to a particularly dense arrangement of inserted cable holders 5.

In the embodiments of FIGS. 1 through 4, each receptacle 4 is arranged in a separate receptacle bay 15. In contrast to this, in the embodiments of FIGS. 5 and 6 the housing 2 comprises a shared receptacle bay 16 for all receptacles 4, such that the housing 2 forms a type of frame for the bay 16.

Figure 6:
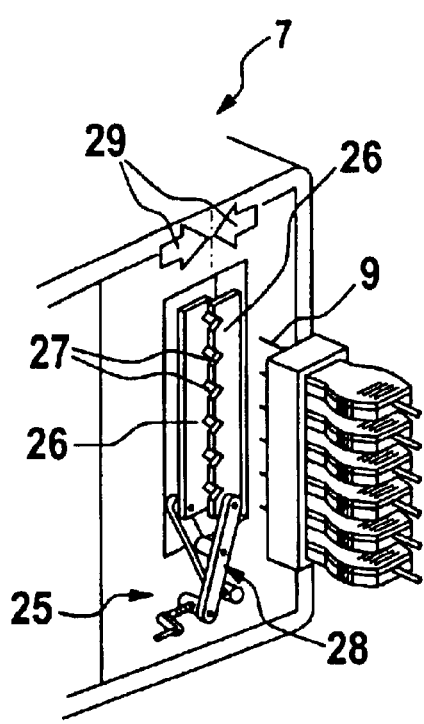

As is evident from FIGS. 5 and 6 for example, the cable holders 5 plugged into the carrier 2 are positioned on the carrier 1 such that the open cable ends of the cables 6 fastened in the cable holders 5 penetrate the housing 2 in plug direction. While in the basic embodiments of FIGS. 5 and 6 the cable holders 5 penetrate the housing 2 in plug direction, the housing 2 of the embodiments shown in FIGS. 1 through 4 provide a section 18 on a housing side 17 facing away from the cable holder side 3 that forms a limit stop in the interior of the receptacles 4 for each cable holder 5, at which the respective cable holder 5 is established in plug direction as soon as it assumes the relative position provided for it in the carrier 1.

The receptacles 4 can be equipped according to the embodiments shown here with groove-shaped guide tracks 19, cf. FIG. 3 especially. These guide tracks 19 facilitate the plug-in process for the cable holders 5 and form a positive guide, which ensures localization of the predetermined relative position for the cable holders 5. The cable holders 5 are equipped with corresponding guide elements 20 that stick out to the side, cf. FIG. 2 for example, which mesh with the corresponding guide tracks 19 when plugged in.

In each of the embodiments shown here, the carrier 1 is designed as a multiple plug such that it can be plugged device side 17 first into a multiple socket 21 that is designed complementary to it. This socket 21 is arranged on the measuring and testing device 7 and according to FIG. 1 comprises contacts 22 via which optical and/or electrical signal transmission can be established with the open ends of the cables 6, as soon as the carrier 1 is appropriately connected to the multiple socket 21.

For securing the carrier 1 to the multiple socket 21, a securing device not shown here can be provided with which the plugged in or attached carrier 1 can be secured against automatic detachment from the multiple socket 21. Such a securing device can function in the manner of a linear bayonet latch, for example, with which a form fit is produced between carrier 1 and multiple socket 21 or device 7 respectively by means of linear movement of a slider.

According to FIGS. 2 through 5, a protective cap 23 can also be provided that can be attached to the housing 2 on the device side 17 when the carrier 1 is not connected to the device 7. The protective cap 23 is dimensioned subsequently to cover the open ends of the cables 6 of the cable holders 5 plugged into the carrier 1 contact-free and consequently close the housing 2 on the device side 17. The open cable ends are then positioned within the interior of the protective cap 23 and protected on the outside against dust, dirt and contact.

In the embodiment of FIGS. 1 through 4, the section 18 is provided with a step 24 for attaching the protective cap 23 (cf. FIGS. 1 and 2) that defines the plug action and in addition is dimensioned such that the attached protective cap 23 fits streamline into the outer contour of the housing 2. In contrast to this, in the embodiments of FIG. 5 the protective cap 23 is dimensioned such that the whole frame 2 can be plugged into it.

Limit stops (not shown here) are implemented within the protective cap 23 that limit the plug depth for the housing 2 in order to prevent the open cable ends from contacting the inside of the protective cap 23.

According to FIG. 6, the measuring and/or testing device 7 is equipped with a centering device 25 in the area of its multiple socket 21. Indeed, the open cable ends are positioned with relatively high precision in the cable holders 5 and in the carrier 1, nevertheless residual flexions within the cable 6 can cause some of the open cable ends to deviate from the set ideal position. With the help of the centering device 25 the open cable ends can now be aligned to the contacts 22 on the multiple sockets 21 during the plugging action or after attachment of the carrier 1. The centering device 25, alluded to here merely figuratively, can provide two sliding diaphragms 26, for example, that each provide a V-shape guide 27 for each cable end and that can be moved towards each other according to the arrows 29 by means of a drive 28. Upon activation of the centering device 25, the cable ends extend through the assigned V-guides 27 and are centered as desired by means of moving the sliding diaphragms 26. It is obvious that the centering device 25 can also have another suitable construction. Although it is practical to design the centering device 25 on the measuring and/or testing device 7, in another embodiment it can also be possible to design this or another centering device 25 on the carrier 1.

In the embodiments shown here the plug directions of all the cable holders 5 run parallel to each other. Furthermore, all receptacles 4 are designed here identical. For example, in FIG. 5 a straight line 30 has been charted that runs perpendicular to the plug direction of the cable holders 5 and upon which all open cable ends of the cable 6 are situated at least approximately or ideally that are properly plugged into the carrier 1 with their cable holders 5. If the carrier 1 provides several rows of receptacles 4, then the open cable ends are located at about a level that runs perpendicular to the plug directions of the cable holders 5.

The carrier 1 according to the invention serves as a mount or to position several cable holders 5 before or after they are needed for connection to the device 7, which makes managing several cable holders 5 easier. If the carrier 1 is designed as a multiple plug, then connecting several cable holders 5 to the device 7 is made substantially easier. Furthermore, the space needed on the device 7 for connecting several cable holders 5 is substantially reduced as considerably less free space is necessary to access a multiple socket 21 than to access several individual sockets.

Obviously, at least one other multiple socket 21 can be arranged on the measuring and/or testing device 7 next to the multiple socket 21 shown such that a large number of cable holders 5 can be connected to the device 7 relatively quickly using the inventive carrier 1.

What is claimed is:

1. A multiple plug for plurality of cable holders for at least one of holding or channeling optical fiber cables comprises:
    a housing including a plurality of receptacles on a cable holder side for receiving the cable holders in a plug direction,
        wherein cables that are held by the cable holders and that stick out from the cable holders in the plug direction, penetrate the housing on a side that faces away from the cable holder side when the cable holders are plugged into the plurality of receptacles, wherein the plug directions of at least two of the plurality of receptacles run parallel to each other,
    wherein the multiple plug is operable to be plugged into a complementary multiple socket that is arranged on a device, and that provides contacts for an optical signal transfer for open ends of the cables of the cable holders plugged into the multiple plug, and
    a centering device, with which the open ends of the cables are arranged to the contacts of the multiple socket.

2. A multiple plug according to claim 1, wherein a safety is provided that secures the multiple plug plugged into the multiple socket on the device.

3. A multiple plug according to claim 1, further comprising a securing device for securing the multiple plug to the multiple socket formed in the manner of a linear bayonet latch.

4. A multiple plug according to claim 1, further comprising a protective cap attached to the housing that receives and externally protects the open ends of the cables of the cable holders plugged into the carrier.

5. A multiple plug according to claim 1, wherein at least two of the plurality of receptacles are designed identically.

6. A multiple plug according to claim 1, wherein at least one of the receptacles includes guide tracks that run parallel to the plug direction, wherein complementary guide elements are arranged on the corresponding cable holder that conspire with the guide tracks when plugging the cable holder into the receptacle.

7. A multiple plug according to claim 1, wherein the housing provides a joint receiving port on its cable holder side that includes at least two of the plurality of receptacles.

8. A multiple plug according to claim 1, wherein the housing provides several receiving ports on its cable holder side, each of which includes only one of the receptacles.

9. A multiple plug according to claim 1, wherein each receptacle and the cable holder plugged into it is assigned a catch, at which the cable holder fastens when it occupies a preset relative position in the receptacle.

10. A multiple plug according to claim 1, wherein at least two of the plurality of receptacles provide a larger width than height lateral to the plug direction, wherein these receptacles are arranged upwardly over and next to each other.

11. A multiple plug according to claim 1, wherein at least two of the plurality of receptacles are designed such that when a cable holder is plugged into them, the open ends of the cables are at least one of on a straight line that runs perpendicular to the plug direction or on a plane that runs perpendicular to the plug direction.

12. At least one of a measuring device for measuring or a testing device for testing at least one of optical components or parts with at least one multiple socket, into which a complementary multiple plug according to claim 1 can be plugged, from which several open ends of cables stick out on one side of the device that faces the device, wherein each multiple socket provides a contact for the open cable ends for an optical signal transfer.

13. A multiple socket, for at least one of a measuring for measuring or a testing device for testing at least one of optical components or parts, wherein a complementary multiple plug according to claim 1 can be plugged into he multiple socket, from which multiple plug several open ends of cables stick out on a side facing the multiple sockets, wherein each multiple socket provides a contact for the open cable ends for an optical signal transfer.

* * * * *

UNITED STATES PATENT AND TRADEMARK OFFICE
CERTIFICATE OF CORRECTION

PATENT NO.    : 6,783,391 B2
DATED         : August 31, 2004
INVENTOR(S)   : Schlueter et al.

It is certified that error appears in the above-identified patent and that said Letters Patent is hereby corrected as shown below:

Column 5,
Line 33, between "for" and "plurality" please insert -- a --
Lines 53-54, between "safety" and "is" please insert -- lug --

Column 6,
Line 49, please replace "he" with -- the --

Signed and Sealed this

Twelfth Day of April, 2005

JON W. DUDAS
*Director of the United States Patent and Trademark Office*